US012800118B2

(12) United States Patent
Anderson

(10) Patent No.: US 12,800,118 B2
(45) **Date of Patent: *Nov. 17, 2026**

(54) SOUND AND ILLUMINATION DEVICE FOR BICYCLES

(71) Applicant: Brightz, Ltd., Ottawa Lake, MI (US)

(72) Inventor: Brent Anderson, Ottawa Lake, MI (US)

(73) Assignee: BRIGHTZ, LTD., Ottawa Lake, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 19/317,448

(22) Filed: Sep. 3, 2025

(65) Prior Publication Data

US 2026/0002647 A1 Jan. 1, 2026

Related U.S. Application Data

(63) Continuation of application No. 18/626,048, filed on Apr. 3, 2024, now Pat. No. 12,429,181, which is a continuation of application No. 17/986,670, filed on Nov. 14, 2022, now Pat. No. 11,976,803, which is a
(Continued)

(51) Int. Cl.

| | |
|---|---|
| ***F21S 9/02*** | (2006.01) |
| ***B62J 3/04*** | (2020.01) |
| ***B62J 6/26*** | (2020.01) |
| ***B62J 11/00*** | (2020.01) |
| ***F21V 33/00*** | (2006.01) |

(Continued)

(52) U.S. Cl.
CPC . *F21S 9/02* (2013.01); *B62J 3/04* (2020.02); *B62J 6/26* (2020.02); *F21V 33/008* (2013.01); *B62J 11/00* (2013.01); *F21W 2107/13* (2018.01); *F21Y 2115/10* (2016.08)

(58) Field of Classification Search
CPC ......... B62J 6/26; B62J 6/22; B62J 6/16; B62J 3/14; B62J 3/04
See application file for complete search history.

(56) References Cited

U.S. PATENT DOCUMENTS 6,945,677 B2 * 9/2005 Fu .......................... G10K 1/071 340/432
7,506,989 B2 3/2009 Tomassetti
7,681,516 B2 3/2010 Chen
(Continued)

FOREIGN PATENT DOCUMENTS

CN 203473072 U 3/2014
GB 2411513 A 8/2005
(Continued)

*Primary Examiner* — William N Harris
(74) *Attorney, Agent, or Firm* — Vorys, Sater, Seymour and Pease LLP; Rex W. Miller, II

(57) ABSTRACT

A sound and illumination device including a sound-maker, an illumination portion, and an attachment portion for mounting on a bicycle. The sound-maker including a lever, a spring, a striker, and a metal portion, wherein the metal portion covers the lever, the spring, and the striker. The lever may include a magnet. The illumination portion including a cover portion, an electrical circuit, a switch, a light source and a power source. Actuation of the lever of the sound-maker results in the activation of the light source of the illumination portion resulting in the concurrent emission of light and sound.

13 Claims, 9 Drawing Sheets

Related U.S. Application Data continuation of application No. 17/591,942, filed on Feb. 3, 2022, now Pat. No. 11,530,788.

(60) Provisional application No. 63/145,080, filed on Feb. 3, 2021.

(51) Int. Cl.

| | |
|---|---|
| ***F21W 107/13*** | (2018.01) |
| ***F21Y 115/10*** | (2016.01) |

(56) References Cited

U.S. PATENT DOCUMENTS

| | | | | |
|---|---|---|---|---|
| 11,518,463 | B2 * | 12/2022 | Aymar | G10K 1/26 |
| 2004/0057463 | A1 | 3/2004 | Fu | |
| 2005/0157484 | A1 | 7/2005 | Fu | |
| 2009/0308301 | A1 * | 12/2009 | Chen | B62J 50/40<br>116/3 |
| 2012/0051072 | A1 | 3/2012 | Yelverton | |
| 2015/0274231 | A1 | 10/2015 | White | |
| 2017/0259868 | A1 | 9/2017 | Hu | |
| 2020/0317284 | A1 | 10/2020 | Aymar | |
| 2021/0214033 | A1 | 7/2021 | Kim | |

FOREIGN PATENT DOCUMENTS

| | | | |
|---|---|---|---|
| JP | 2000025667 | A | 1/2000 |
| WO | 2006113891 | A2 | 10/2006 |
| WO | 2014066706 | A1 | 5/2014 |
| WO | 2017153720 | A1 | 9/2017 |

* cited by examiner

SOUND AND ILLUMINATION DEVICE FOR BICYCLES

CROSS-REFERENCE TO RELATED APPLICATIONS

This application is a continuation of and claims the benefit of U.S. application Ser. No. 18/626,048 entitled "Sound and Illumination Device for Bicycles" filed Apr. 3, 2024, U.S. application Ser. No. 17/986,670 entitled "Sound and Illumination Device for Bicycles" filed Nov. 14, 2022, now issued U.S. Pat. No. 11,976,803, and U.S. application Ser. No. 17/591,942 entitled "Sound and Illumination Device for Bicycles" filed Feb. 3, 2022, now issued U.S. Pat. No. 11,530,788, and the benefit of U.S. Provisional Patent Application No. 63/145,080, filed on Feb. 3, 2021, each of which are incorporated by reference in their entirety herein.

BACKGROUND

Although mostly recreational, biking can be a potentially dangerous activity. Many jurisdictions require by law the use of a bicycle bell as a safety measure to alert pedestrians of an approaching bicycle. However, stand-alone bicycle bells fail to alert pedestrians that are, for example, hearing-impaired or have temporary limited hearing due to the use of headphones or earphones. Therefore, there is a need for an enhanced safety bicycle device that provides audio and visual alerts simultaneously.

SUMMARY

Currently disclosed is a sound and illumination device for bicycles comprising a sound-making portion, an illumination portion, and an attachment portion for mounting on a bicycle. The sound-making portion comprising a lever, a spring, a striking portion, and a metal portion, wherein the metal portion covers the lever, the spring, and the striking portion. The lever may include a magnet. The illumination portion comprising a cover portion, an electrical circuit, a switch, a light emitting source and a power source. The switch may comprise a reed switch. Alternatively, the switch may comprise a hall-effect sensor.

Actuation of the lever of the sound-making portion results in the activation of the light emitting source of the illumination portion; thus, resulting in the concurrent emission of light and sound. Operation of the lever causes the striking portion to make contact with the metal portion. The metal portion reverberate emitting sound. Simultaneously, operation of the lever causes the lever to move from a starting point to an ending point. In an embodiment, wherein the lever includes a magnet, moving the lever from a starting point to an ending point causes the magnet to move over the switch of the illumination portion resulting in the concurrent activation of the light emitting source.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION OF THE DRAWINGS

As illustrated in FIGS. 1-10, currently claimed is a sound and illumination bicycle safety device 10 comprising a sound-making portion 12, an illumination portion 14, and an attachment portion 16. The sound-making portion 12 is removably attached to the illumination portion 14. The illumination portion 14 is removably attached to the attachment portion 16. The attachment portion provides for the safety device to be mounted to a bicycle, for example to a handlebar of the bicycle. Operation of the sound-making portion results in the simultaneous activation of the illumination portion providing for an enhanced bicycle safety device.

Figure 1:
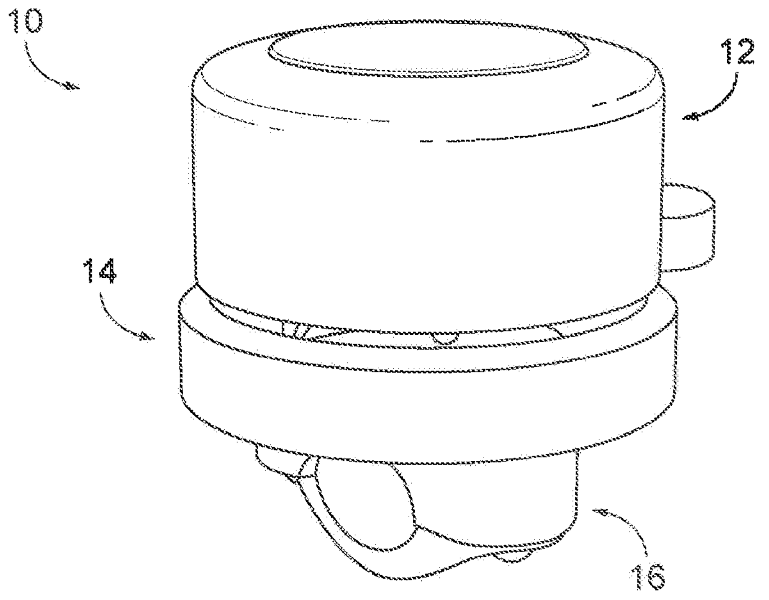
FIG. 1 illustrates a sound and illumination bicycle device.
Figure 2:
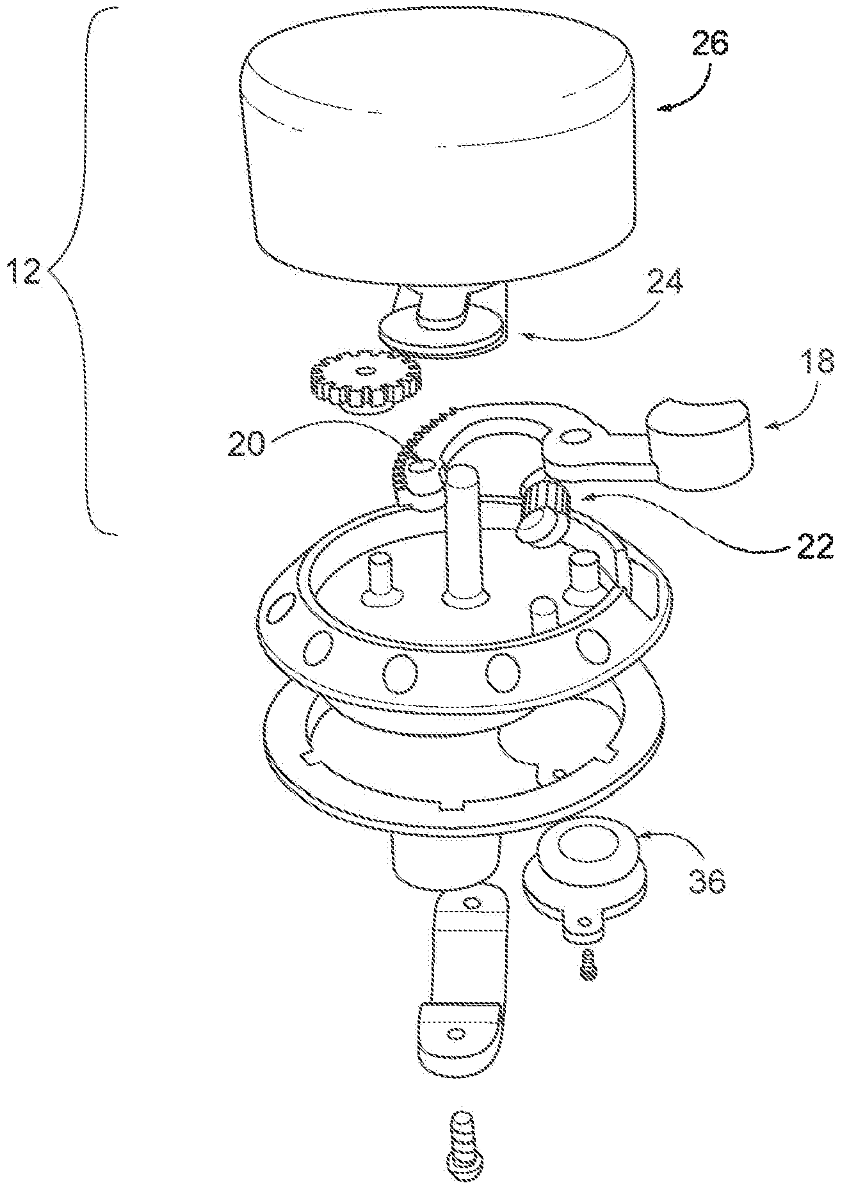
FIG. 2 illustrates an exploded view of a sound and illumination bicycle device.
Figure 3:
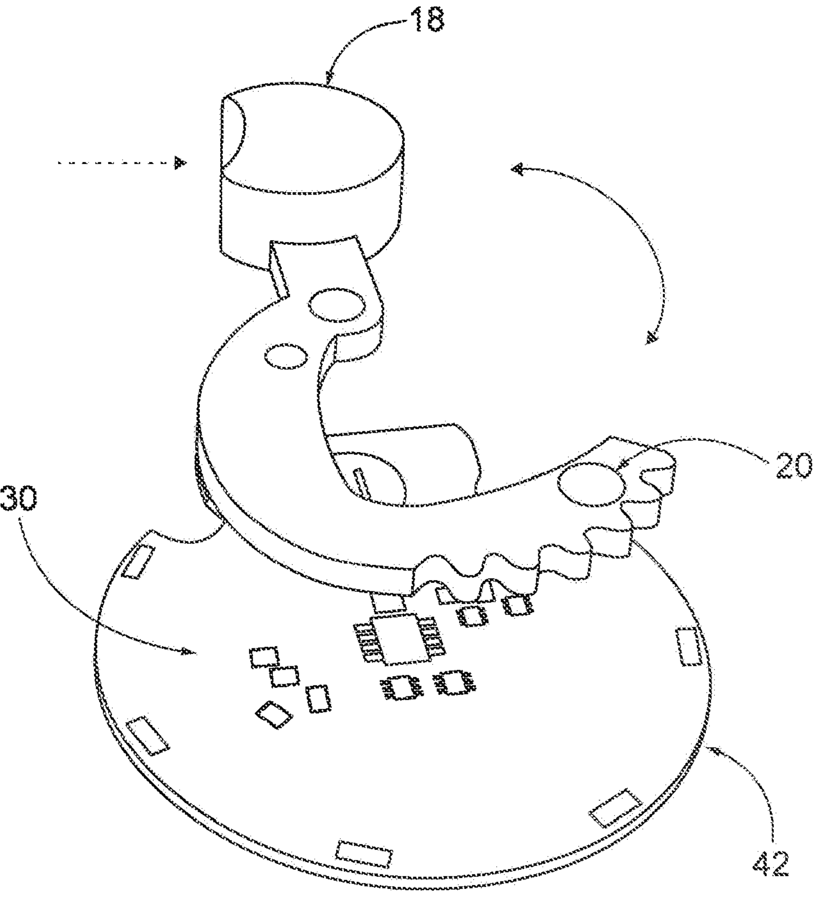
FIG. 3 illustrates an exploded view of parts of a sound and illumination bicycle device.
Figure 4:
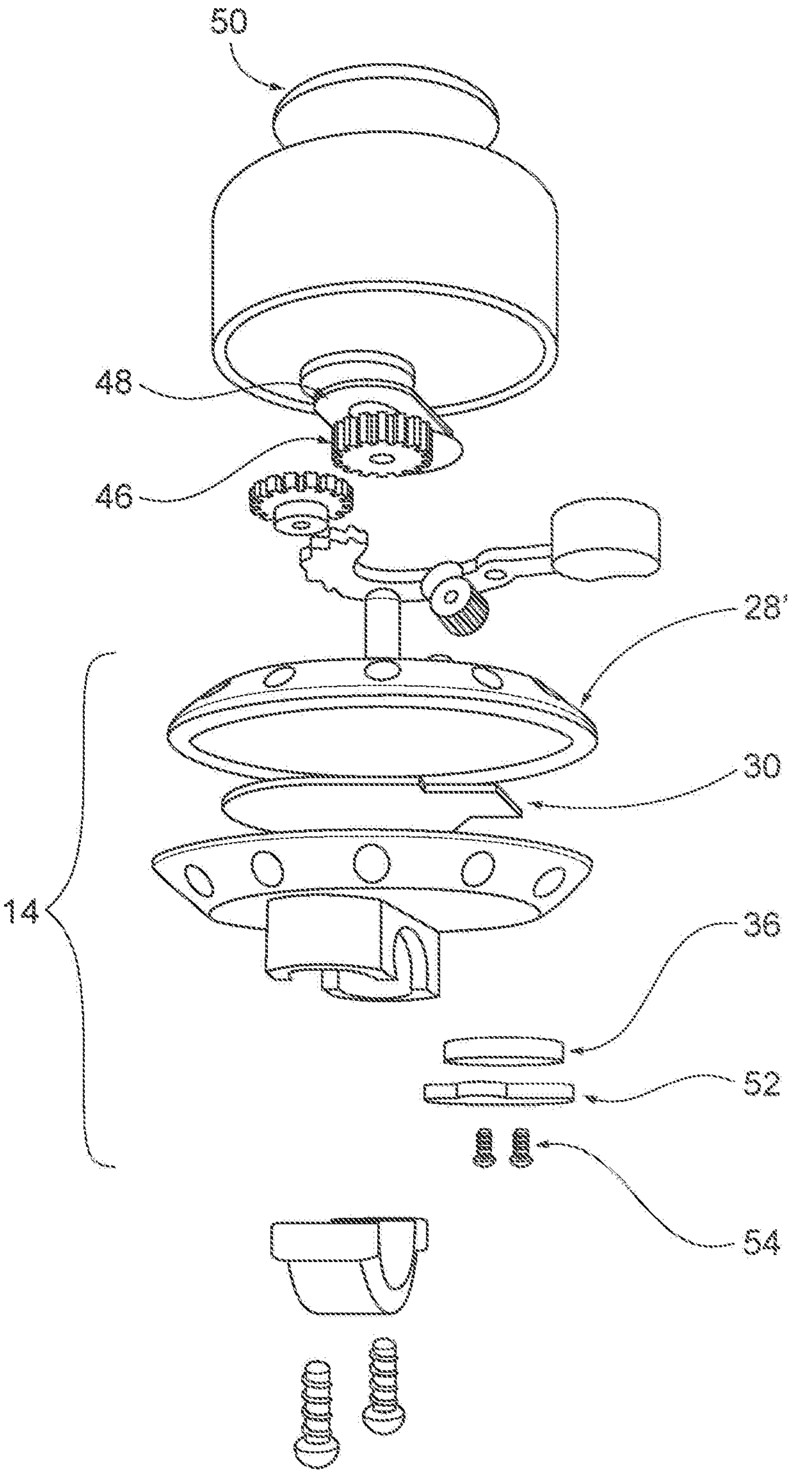
FIG. 4 illustrates an exploded view of a sound and illumination bicycle device.
Figure 5:
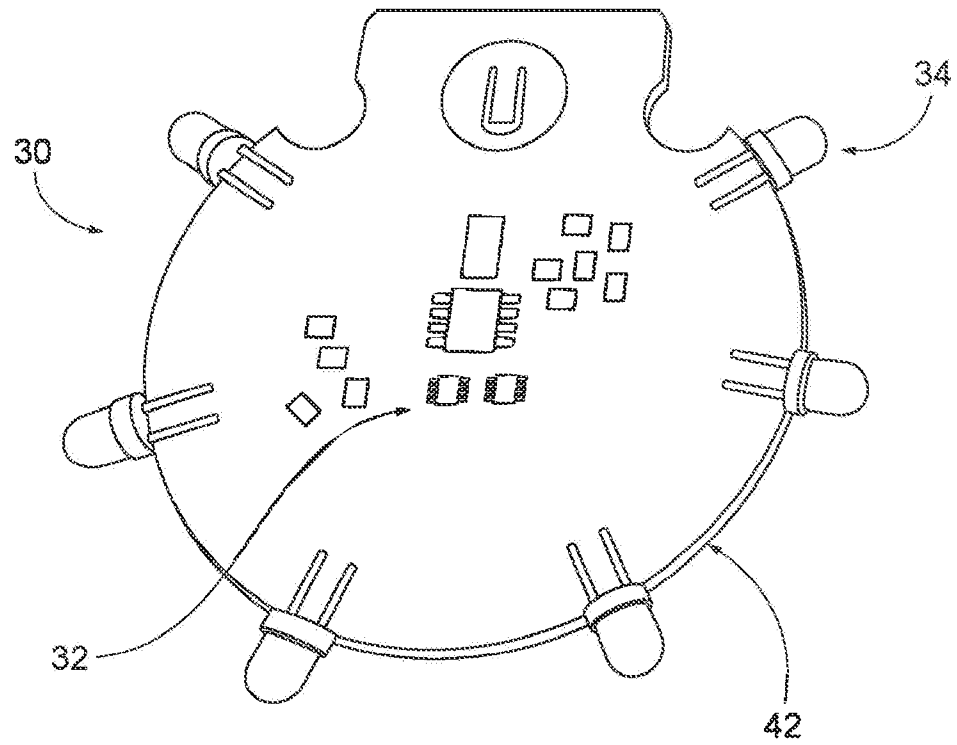
FIG. 5 illustrates parts of an illumination portion of a sound and illumination bicycle device.
Figure 6:
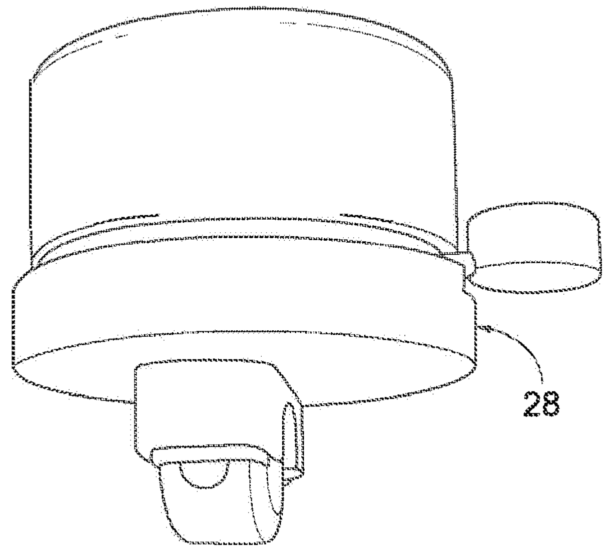
FIG. 6 illustrates a sound and illumination bicycle device.
Figure 7:
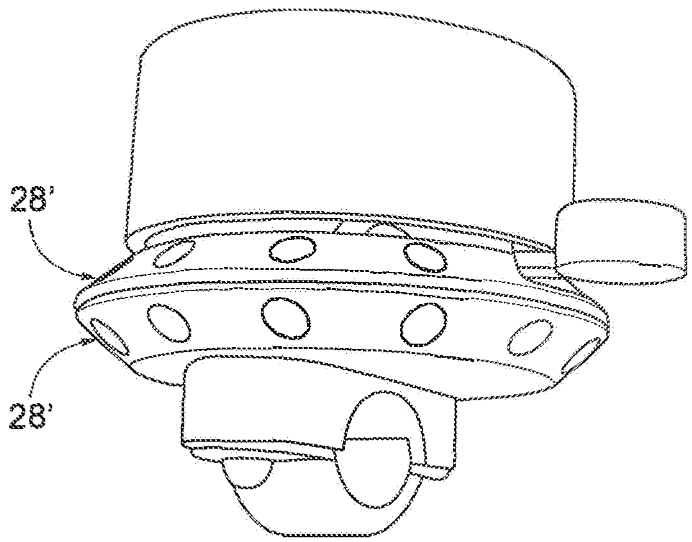
FIG. 7 illustrates a sound and illumination bicycle device.

As illustrated in FIGS. 2-4, the sound-making portion 12 comprises a lever 18, a spring 22, a striking portion 24, and a metal portion 26, wherein the metal portion 26 covers the lever, the spring, and the striking portion. The metal portion 26 may comprise a removable attached top portion 48. The striking portion 24 is removable attached to the lever 18. The striking portion may comprise a rotational element 46 with at least one hammer element 48.

The lever 18 may further comprise a magnet 20. The spring 22 is attached to the lever 18 keeping the lever in tension. As illustrated in FIG. 3, when the lever is operated by pushing the same forward (represented with a dashed arrow), the lever stretches the spring and moves from a starting point to an ending point. The spring then pulls the lever back to the starting position. Said movement has been illustrated with a double-headed arrow.

As shown in FIGS. 4-7, the illumination portion 14 comprises a cover portion 28, an electrical circuit 30, a switch 32, a light emitting source 34 and a power source 36. The cover portion may comprise of a translucent material. The cover portion may comprise a single portion 28. Alternatively, or additionally, the cover portion may comprise two removably attached portions 28'.

The power source 36 powers the light emitting source 34. The power source may comprise at least one battery, for example, a cell battery. Alternatively, or additionally, the power source may comprise a solar cell battery or batteries. The illumination portion may further comprises a battery lid 52. Said battery lid removably attached to the cover portion, for example, with fasteners 54.

The cover portion 28 of the illumination portion encloses the electrical circuit, the switch, the light emitting source and the power source. The switch is in electrical contact with the circuit and with the light emitting source providing for the light emitting source to be activated, as desired. In one embodiment, the switch may be a reed switch. In another embodiment, the switch may be a hall-effect sensor.

The illumination portion may further comprise a printed circuit board (PCB) 42 located within the cover portion 28.

The switch 32 may be connected to PCB 42, said PCB in electrical contact with the light emitting source.

Figure 8:
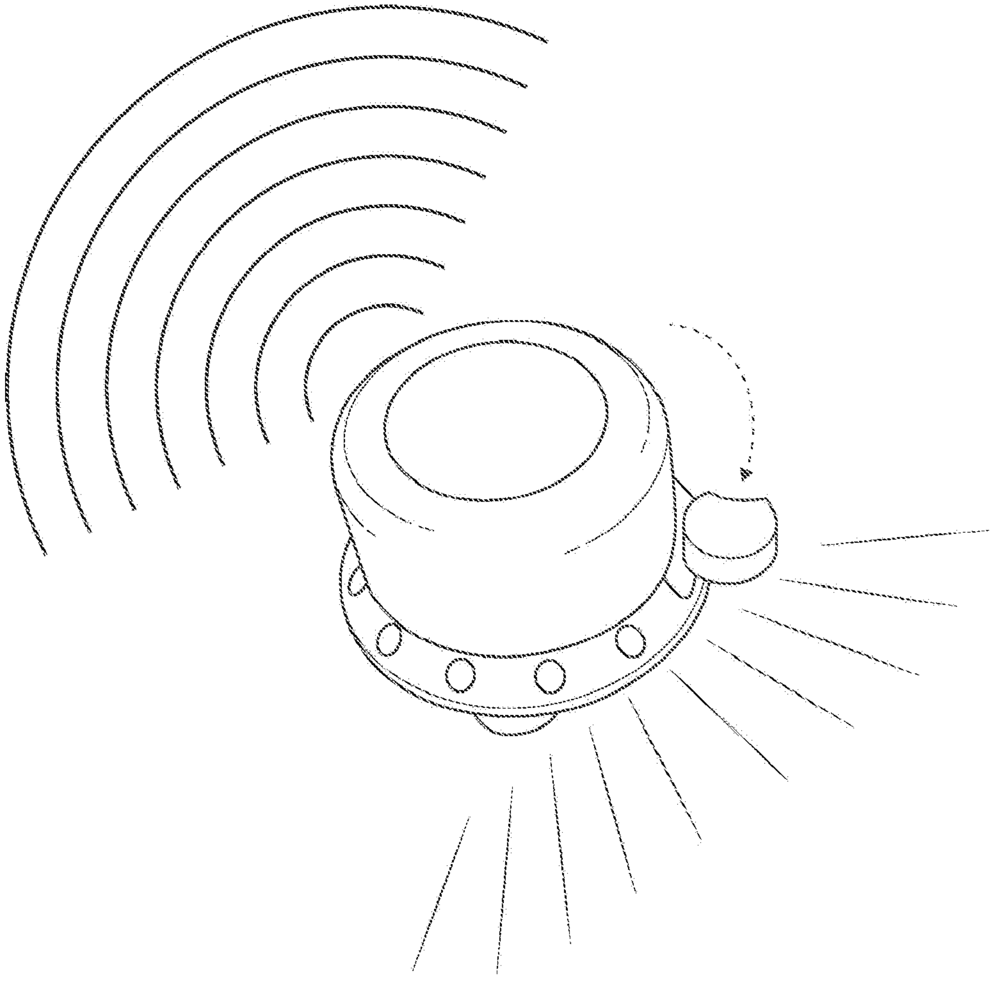
FIG. 8 illustrates a sound and illumination bicycle device.
Figure 9:
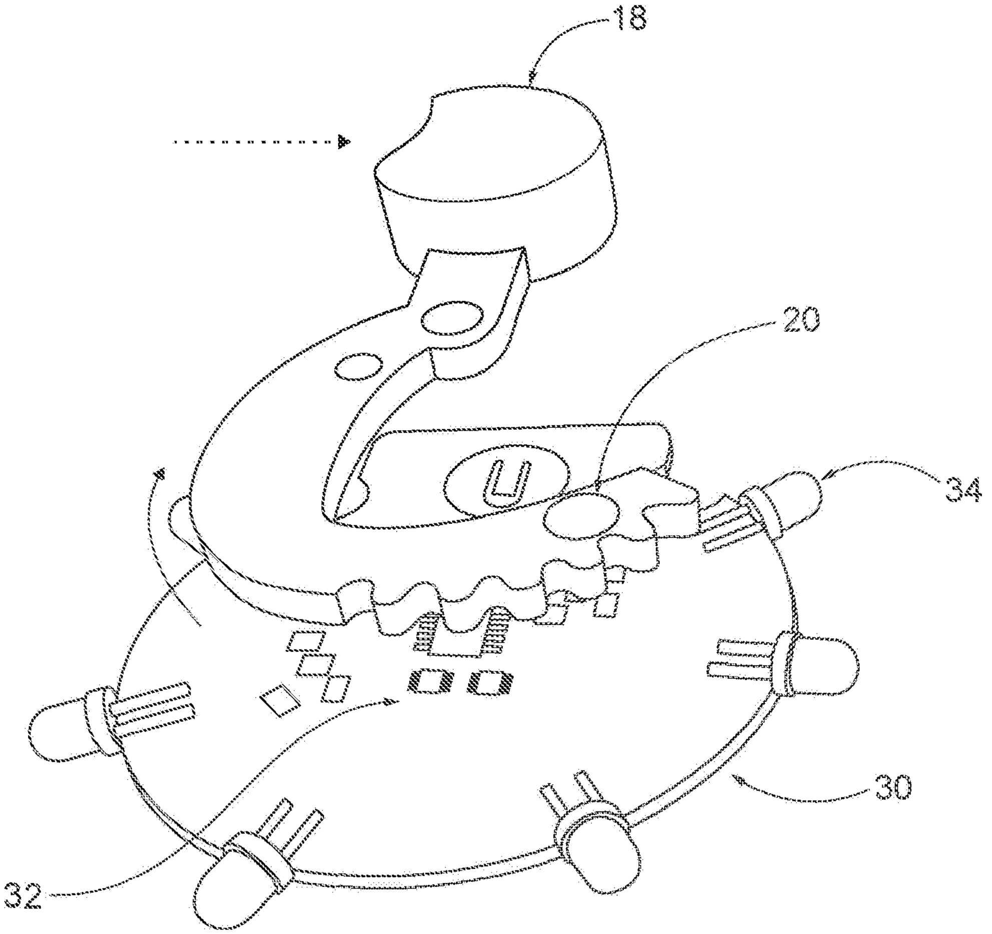
FIG. 9 illustrates an exploded view of parts of a sound and illumination bicycle device.

Operation of the currently disclosed safety device 10 results in simultaneous light and sound emission. The lever 18 of the sound-making portion is removably attached to the illumination portion. The lever 18 is located within the cover portion 28 of the illumination portion. As illustrated in FIGS. 8-9, operation of the lever 18 causes the striking portion 24 to make contact with the metal portion 26 causing the metal portion to reverberate; thus, emitting a sound. Concurrently, operating the lever of the sound-making portion causes the switch of the illumination portion to activate. This in turn, triggers the electrical circuit of the illumination portion to activate the light emitting source, for example, a light emitting diode (LED), to emit light. Thus, operation of the lever causes the device to emit both sound and light at the same time.

As shown in FIG. 9, the lever 18 may include a magnet 20. Pushing the lever with magnet 20 forward causes the magnet 20 to move over the electrical circuit 30 and switch 32. When the magnet moves over the switch, a closed circuit is formed and power flows. This closed circuit then powers the light emitting source 34, for example an LED; thus, emitting light. Alternatively, or additionally, the closed circuit may power the PCB 42, which in turn powers the light emitting source 34 for a period of time.

In another embodiment, the switch 32 may comprise a conductive portion electrically attached to one end of the electrical circuit. When the lever is operated, the lever stretches the spring and moves from a starting position to an ending position. The spring then pulls the lever back to the starting position. In the starting position, the lever may be pushed against the conductive portion. The conductive portion moves with the lever and contacts a terminal. When the conductive portion contacts the terminal, a closed circuit is formed and power flows. This closed circuit then powers the light emitting source, for example, a LED. Alternatively, the closed circuit may power the PCB, which in turn powers light emitting source for a period of time.

Figure 10:
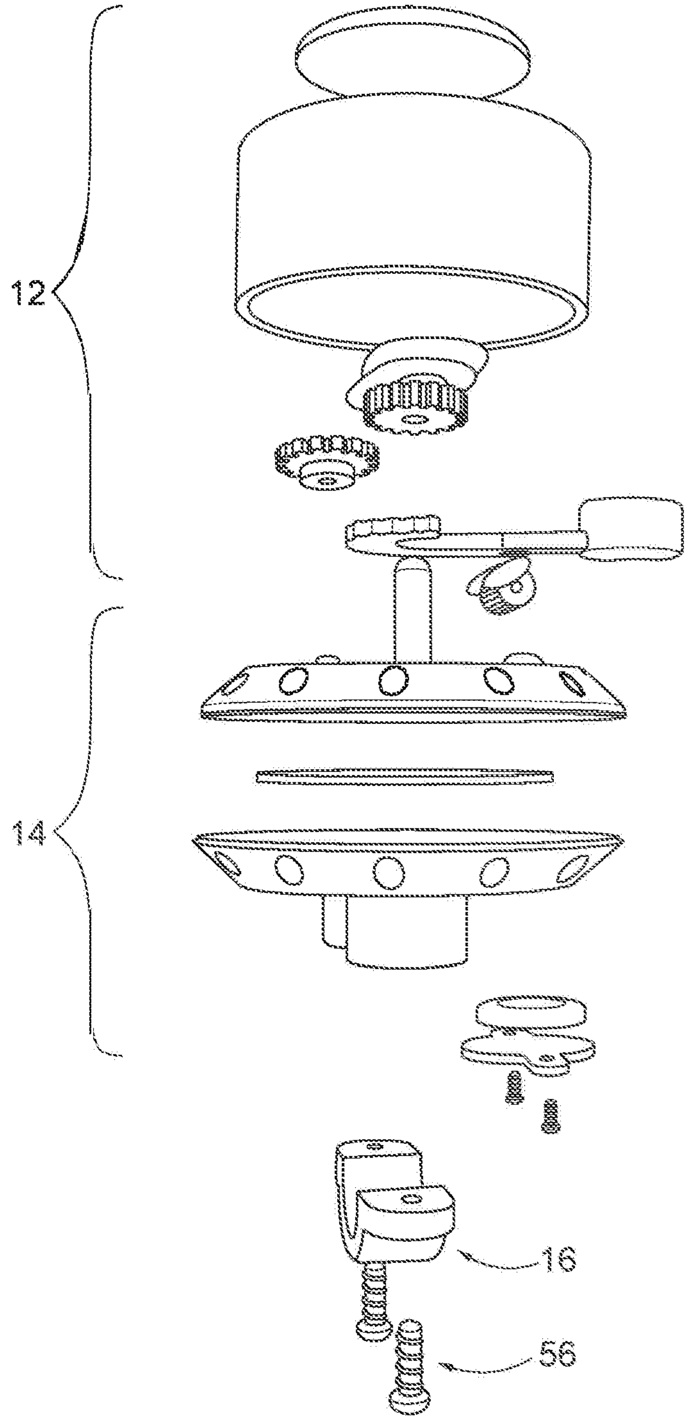
FIG. 10 illustrates an exploded view of a sound and illumination bicycle device.

As shown in the Figures, for example in FIG. 10, the device comprises in part an attachment portion 16. The attachment portion is removably attached to the illumination portion 14 via, for example, fasteners 56. The attachment portion allows for the device to be mounted to a bicycle, for example, to a handlebar. The attachment portion may comprise a clamp mounting.

While this invention has been shown and described with respect to a detailed embodiment thereof, it will be understood by those skilled in the art that changes in form and detail thereof may be made without departing from the scope of the claims of the invention.

What is claimed:

1. A sound and illumination bicycle device comprising:

an illumination portion, a sound-maker coupled to a top side of the illumination portion, and an attachment portion coupled to a bottom side of the illumination portion, wherein the illumination portion comprises a cover portion, a lever extending through the cover portion, a switch, a light source, and a power source, and wherein actuation of the lever causes the sound-maker to emit sound and the switch to close a circuit between the power source and the light source such that the illumination portion emits light.

2. The device of claim 1, wherein:

the lever comprises a magnet, the switch comprises a magnetically sensitive component, and actuation of the lever causes the magnet to activate the magnetically sensitive component of the switch thereby causing activation of the light source of the illumination portion.

3. The device of claim 2, wherein the magnetically sensitive component of the switch is a reed switch.

4. The device of claim 2, wherein the magnetically sensitive component of the switch is a Hall effect sensor.

5. The device of claim 1, wherein the light source comprises at least one light emitting diode (LED).

6. The device of claim 1, wherein the power source comprises a cell battery.

7. The device of claim 1, the illumination portion further comprising a printed circuit board (PCB) electrically coupled to and mechanically supporting the light source.

8. The device of claim 1, wherein the cover portion of the illumination portion comprises a translucent material.

9. The device of claim 1, wherein the cover portion comprises two removably attached portions.

10. The device of claim 1, wherein the attachment portion couples the device to a bicycle handlebar.

11. The device of claim 1, wherein the switch comprises a conductive portion configured to be actuated by the lever such that the conductive portion moves with the lever and contacts a terminal of an electrical circuit causing energy from the power source to activate the light source of the illumination portion.

12. The device of claim 1, wherein the sound-maker comprises a striker and a metal portion, wherein:

the metal portion covers the lever, a spring, and the striker, the striker is coupled to the lever, the striker comprises a rotational element and at least one hammer, and when the lever is actuated, the at least one hammer strikes the metal portion thereby generating sound.

13. The device of claim 1, wherein activation of the light source of the illumination portion is concurrent with activation of the sound-maker.

* * * * *